United States Patent
Fischer et al.

(10) Patent No.: US 9,466,153 B2
(45) Date of Patent: Oct. 11, 2016

(54) VEHICLE MAINTENANCE REMINDERS

(71) Applicant: Myine Electronics, Inc., Ferndale, MI (US)

(72) Inventors: Joel J. Fischer, Royal Oak, MI (US); Marco Gatti, Grosse Ile, MI (US); Joey Ray Grover, Madison Heights, MI (US); Michael Burke, Detroit, MI (US)

(73) Assignee: Myine Electronics, Inc., Ferndale, MI (US)

( * ) Notice: Subject to any disclaimer, the term of this patent is extended or adjusted under 35 U.S.C. 154(b) by 21 days.

(21) Appl. No.: 14/452,166

(22) Filed: Aug. 5, 2014

(65) Prior Publication Data

US 2016/0042576 A1 Feb. 11, 2016

(51) Int. Cl.
*G07C 5/00* (2006.01)
*G05B 23/02* (2006.01)
*B60R 16/023* (2006.01)

(52) U.S. Cl.
CPC ........... *G07C 5/006* (2013.01); *G05B 23/0283* (2013.01); *B60R 16/0234* (2013.01)

(58) Field of Classification Search
CPC .............. G07C 5/006; G05B 23/0283; G05B 23/0218; G05B 23/00; B60R 16/0234
See application file for complete search history.

(56) References Cited

U.S. PATENT DOCUMENTS

| | | |
|---|---|---|
| 6,768,934 B2 | 7/2004 | Sumida et al. |
| 8,606,629 B2 | 12/2013 | Bous et al. |
| 2002/0099665 A1 | 7/2002 | Burger et al. |
| 2004/0249531 A1* | 12/2004 | Kelly ................... G01M 17/007 701/29.4 |
| 2009/0099720 A1* | 4/2009 | Elgali .................... G06Q 10/06 701/31.4 |
| 2011/0302092 A1* | 12/2011 | Basir ..................... G06Q 10/20 705/305 |
| 2014/0310186 A1* | 10/2014 | Ricci ..................... H04W 48/04 705/302 |

FOREIGN PATENT DOCUMENTS

JP 2006003329 A * 1/2006

OTHER PUBLICATIONS

Machine translation of JP 2006003329.*
CNN, Apr. 25, 2012, www.wtvy.com/home/headlines/Mobile_Carwash_App_Makes_A_Splash.

* cited by examiner

*Primary Examiner* — Abby Lin
(74) *Attorney, Agent, or Firm* — Jennifer M. Stec; Brooks Kushman P.C.

(57) ABSTRACT

A system may determine, based on vehicle data received from vehicle sensors, a maintenance indication indicative of vehicle maintenance required according to a vehicle maintenance schedule, identify a maintenance time indication for which a maintenance procedure unrelated to the vehicle maintenance schedule should be performed, and generate a maintenance recommendation to provide in a vehicle human-machine interface offering to perform the vehicle maintenance and the unrelated maintenance procedure. The system may also identify, based on driver maintenance preferences, a weather-specific maintenance procedure unrelated to a vehicle maintenance schedule, identify a maintenance time indication according to properties of weather appropriate for the weather-specific maintenance procedure and weather forecast data queried from a weather service, and present a maintenance recommendation offering to perform required vehicle maintenance and the weather-specific maintenance procedure at a time indicated by the maintenance time indication.

20 Claims, 5 Drawing Sheets

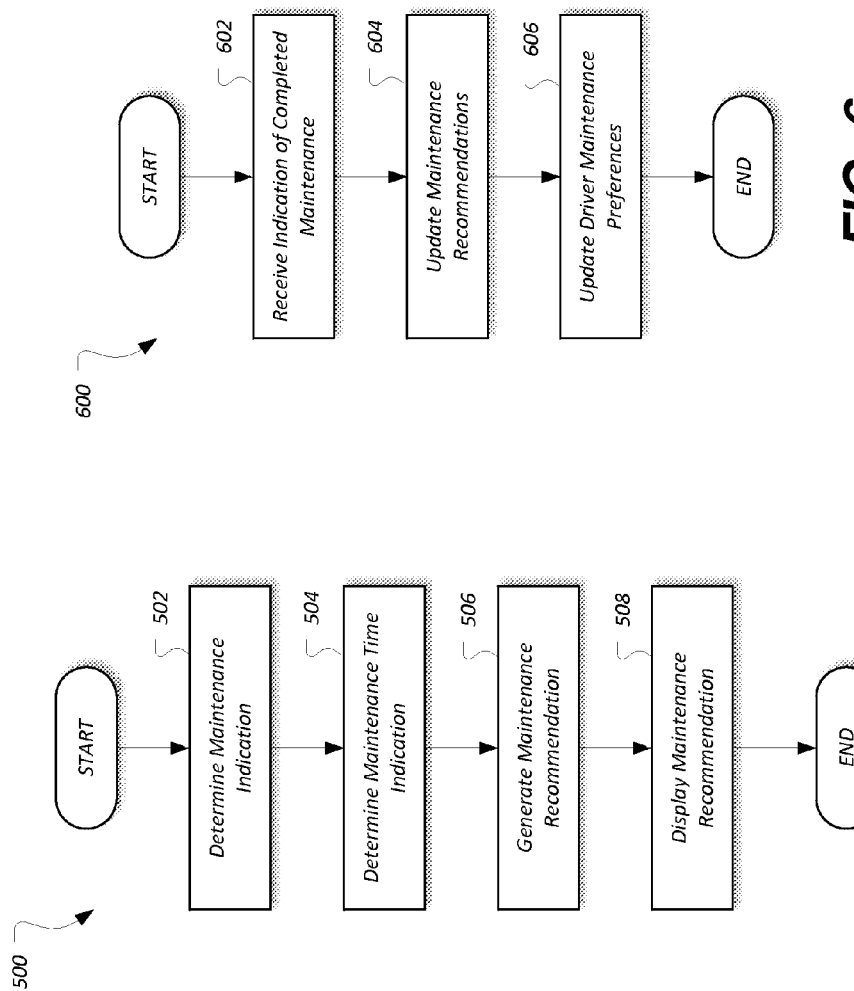

VEHICLE MAINTENANCE REMINDERS

TECHNICAL FIELD

This disclosure generally relates to providing maintenance reminders for a vehicle according to a vehicle maintenance schedule.

BACKGROUND

Vehicles, such as automobiles, require routine maintenance. However, many vehicle owners delay or omit routine maintenance procedures recommended by the vehicle manufacturer. Deferred or omitted vehicle maintenance may cause premature wear or even failure of vehicle components. The vehicle owner may blame this wear on the manufacturer, rather than on his or her own failure to maintain.

SUMMARY

In a first exemplary embodiment, a system includes a processor configured to determine, based on vehicle data received from vehicle sensors and a vehicle maintenance schedule, a maintenance indication indicative of vehicle maintenance that is due, identify a maintenance time indication for performing a weather-specific maintenance procedure unrelated to the vehicle maintenance schedule, and generate a maintenance recommendation offering to perform the vehicle maintenance and the unrelated maintenance procedure at a time indicated by the maintenance time indication.

In a second exemplary embodiment, a system includes a processor configured to identify, based on driver maintenance preferences, a weather-specific maintenance procedure unrelated to a vehicle maintenance schedule, identify a maintenance time indication according to properties of weather appropriate for the weather-specific maintenance procedure and weather forecast data queried from a weather service, and present a maintenance recommendation to perform required vehicle maintenance and the weather-specific maintenance procedure at a time indicated by the maintenance time indication.

BRIEF DESCRIPTION OF THE DRAWINGS

FIG. 5 illustrates an exemplary process for providing maintenance recommendations; and FIG. 6 illustrates an exemplary process for updating the vehicle computing system with respect to maintenance being performed to the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may determine, based on a vehicle maintenance schedule and input from vehicle systems, that the vehicle maintenance is due to be performed. For example, a vehicle computing system (VCS) may be configured to receive information from vehicle sensors regarding fill level or other properties of a vehicle fluid (e.g., oil, coolant, etc.), as well as to determine based on the information whether or not the fluid requires changing. As another example, the VCS may be configured to identify remaining life of a fluid based on indirect information, such as vehicle miles driven, the average speed of the vehicle during those miles and the temperature of the vehicle or environment during those miles. If vehicle maintenance should be performed, the VCS may be configured to provide a reminder to the driver in a human-machine interface (HMI) of the vehicle (e.g., on a display, via a warning light, etc.). The VCS may be similarly configured to determine when other vehicle wear items require servicing, such as filters or brakes, and may provide warnings via the vehicle HMI when such service is indicated. Despite such warnings, vehicle owners may elect to defer vehicle service beyond when the maintenance schedule indicates it should be performed, potentially causing unnecessary vehicle wear or other issues.

A VCS may be further configured to identify, based on forecast weather conditions, a time appropriate for a maintenance procedure unrelated to the maintenance schedule. For example, the VCS may be configured to identify that an upcoming day may be appropriate for a car wash. To encourage the vehicle owner to perform the required vehicle maintenance, the VCS may be configured to provide a maintenance recommendation via the HMI for the required maintenance procedure due for the vehicle (e.g., for an oil change) based on appropriate weather/conditions for a maintenance procedure unrelated to the maintenance schedule (e.g., for the car wash). By providing the maintenance recommendation for the maintenance procedure unrelated to the maintenance schedule along with the maintenance recommendation for the vehicle service, the VCS may be able to improve compliance with the vehicle maintenance schedule, while also offering the vehicle owner suggested times to perform weather-related or other non-essential vehicle maintenance.

Figure 1:
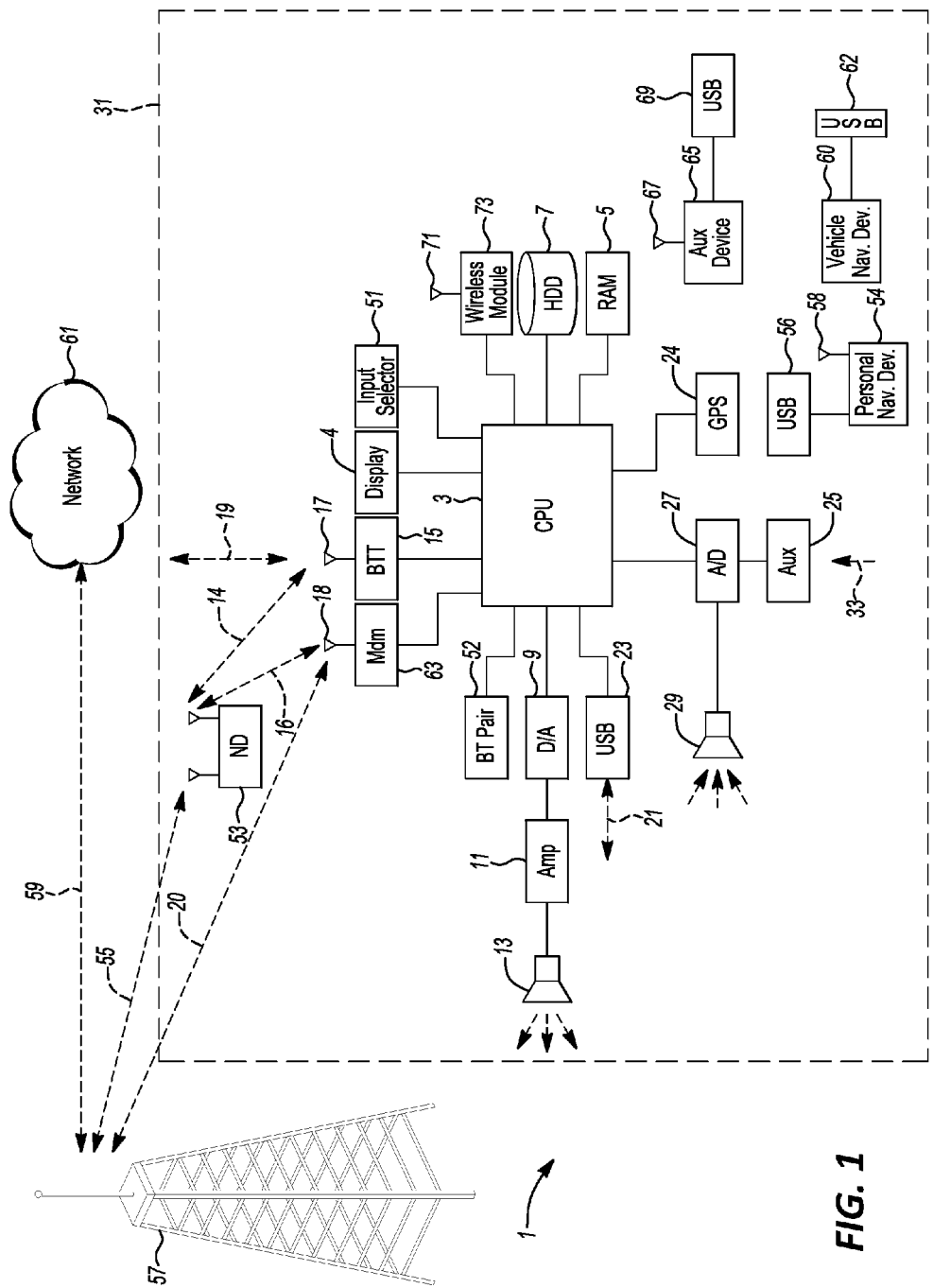
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
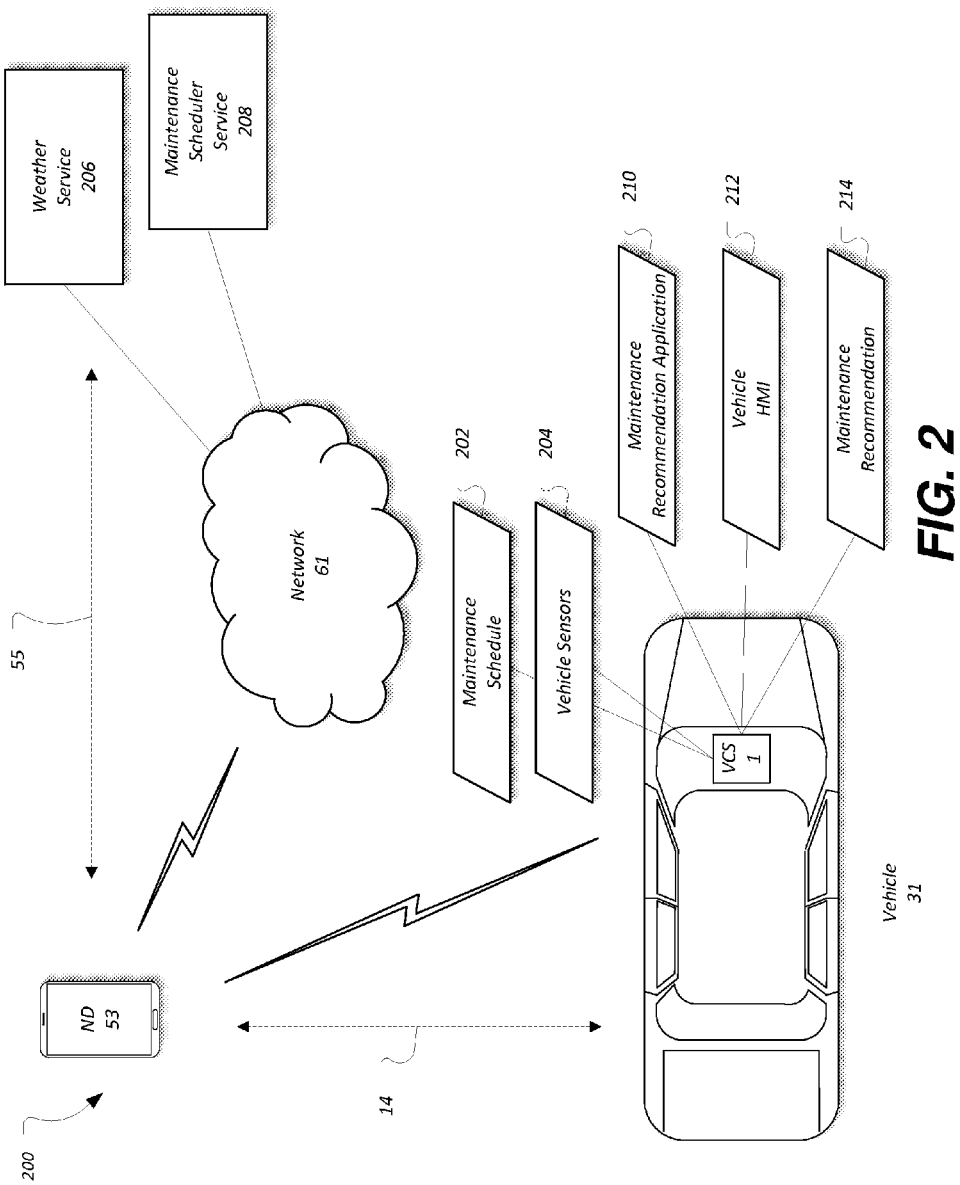
FIG. 2 illustrates an exemplary vehicle having a maintenance recommendation application and vehicle sensors, and in communication with a weather service and calendar service via a network.

FIG. 2 illustrates an exemplary vehicle 31 having a maintenance recommendation application 210 and vehicle sensors 204, and configured to communicate with a weather service 206 and maintenance scheduler service 208 via a network 61. In an example, the VCS 1 of the vehicle 31 may be connected to a paired nomadic device 53 (e.g. via BLUETOOTH), such that the communications features of the nomadic device 53 may be used to allow the VCS 1 to communicate via the network 61 with the weather service 206 and maintenance scheduler service 208. In another example, the VCS 1 may be configured to use an onboard modem 63 to communicate via the network 61. As explained in detail below, the VCS 1 may be configured to execute the maintenance recommendation application 210 to cause the VCS 1 to utilize the vehicle sensors 204 and weather service 206 to provide maintenance recommendations 214 via a vehicle HMI 212, as well as to set up appointments with the maintenance schedule service 208 via the network 61.

The maintenance schedule 202 may include information related to maintenance operations that should be performed for the vehicle 31. In some cases, one or more of the maintenance operations may be specified by the maintenance schedule 202 according to a predetermined interval of time or vehicle miles (e.g., whichever comes first). In other cases, one or more of the maintenance operations may be specified by the maintenance schedule 202 according to a predetermined amount of time or vehicle miles measured from vehicle 31 manufacture. The maintenance operations may include, as some non-limiting examples, oil changes, replacement of brake fluid, brake inspection, suspension inspection, lubrication of vehicle parts, tire rotation, air filter replacement, parking brake adjustment, belt replacement, spark plug replacement, coolant replacement, and idle speed adjustment.

The vehicle sensors 204 may include devices of the vehicle 31 configured to measure quantities relevant to operation of the vehicle 31, as well as to provide a data signal to the vehicle 31 to inform the vehicle 31 regarding the measured quantities. The vehicle sensors 204 may include, as some non-limiting examples, a vehicle speed sensor, a throttle position sensor, a brake light switch sensor, an impact sensor, a coolant temperature sensor, an oil pressure sensor, an engine oxygen sensor, a power steering pressure switch, a steering angle sensor, a lateral acceleration sensor, a longitudinal acceleration sensor, a wheel speed sensor, a tire pressure sensor, an odometer sensor, and an oil temperature sensor.

The weather service 206 may be configured to provide information regarding current and forecast weather conditions. The information regarding weather conditions may include, for example, temperature (e.g., current, forecast low, forecast high, etc.), type of precipitation (e.g., rain, snow, sleet, hail, etc.), likelihood of precipitation (e.g., as a percentage), allergen status (e.g., pollen level, smog level, etc.) among other possibilities. In some cases, forecast weather conditions may be specified over a daily timescale, while in other cases, forecast weather conditions may be specified over a shorter timescale, such as hourly. The weather service 206 may be configured to receive requests for current and/or forecast weather conditions for a specified geographic location and date/time, and respond to the requests with the requested information.

The maintenance scheduler service 208 may be configured to manage appointments for vehicles 31 to have maintenance performed. For example, the maintenance scheduler service 208 may be configured to manage appointments for one or more dealers or other vehicle service centers, to allow customers to book times to have scheduled maintenance performed to their vehicles 31. The maintenance scheduler service 208 may be further configured to keep track of what maintenance was performed, to allow the vehicle service centers to be aware of what maintenance was previously performed to the vehicle 31 and when.

The maintenance recommendation application 210 may be one example of an application program stored on a memory of the nomadic device 53 or VCS 1 (e.g., as software, firmware, etc.). When executed by one or more processors of the nomadic device 53 or VCS 1, the maintenance recommendation application 210 may be configured to cause the nomadic device 53 or VCS 1 to perform various operations related to the determining and providing of maintenance recommendations 214 to the driver via the vehicle HMI 212.

The vehicle HMI 212 may include various input hardware and output hardware serving to create a user interface for the driver and/or other vehicle occupants. Exemplary vehicle HMI 212 input hardware may include microphones for capturing audio input, and one or more user controls such as touch-screens, knobs or buttons (e.g., located on the vehicle dash, on the vehicle steering wheel, etc.). The vehicle HMI 212 may also include output hardware, such as one or more displays to provide visual output (e.g., a head unit touchscreen display, a display of the gauge cluster, etc.) and one or more speakers to provide audio output (e.g., via the vehicle 31 audio system).

The maintenance recommendation 214 may include information suggesting that the vehicle owner take the vehicle 31 in for servicing. For example, the maintenance recommendation 214 may specify a date or time at which the vehicle 31 is suggested to be taken in for servicing. The maintenance recommendation 214 may further include additional information regarding the servicing, such as the proposed maintenance to be performed, a cost for the maintenance procedures, and an indication of how immediate the need is for the recommended maintenance to be performed, as some possibilities. The maintenance recommendation 214 may further include information indicative of whether or not the maintenance requested by the maintenance recommendation 214 has been performed.

The maintenance recommendation application 210 may be configured to determine, based on the maintenance schedule 202 and input from the vehicle sensors 204, that vehicle maintenance is due to be performed. The maintenance recommendation application 210 may be further configured to identify, based on forecast weather conditions requested from the weather service 206, a time appropriate for a maintenance procedure unrelated to the maintenance schedule 202. For example, the maintenance recommendation application 210 may be configured to identify that an upcoming day may be appropriate for a car wash. To encourage the vehicle owner to perform the vehicle service required by the maintenance schedule 202, the maintenance recommendation application 210 may be configured to provide the maintenance recommendation 214 via the vehicle HMI 212 for the maintenance procedure due for the vehicle 31 (e.g., oil change) based on appropriate weather/conditions for the maintenance procedure unrelated to vehicle wear items also included in the maintenance recommendation 214 and tied to the vehicle 31 (e.g., for a car wash).

By providing in the maintenance recommendation 214 an offer for a maintenance procedure unrelated to vehicle 31 wear along with the maintenance recommendation 214 for the vehicle servicing specified by the maintenance schedule 202, the maintenance recommendation 214 may be able to improve operator compliance with the maintenance schedule 202, while at the same time offering the vehicle owner good times to perform weather-related vehicle maintenance. Further details of the operation of the maintenance recommendation application 210 are discussed in detail below with respect to FIGS. 3-5.

Figure 3:
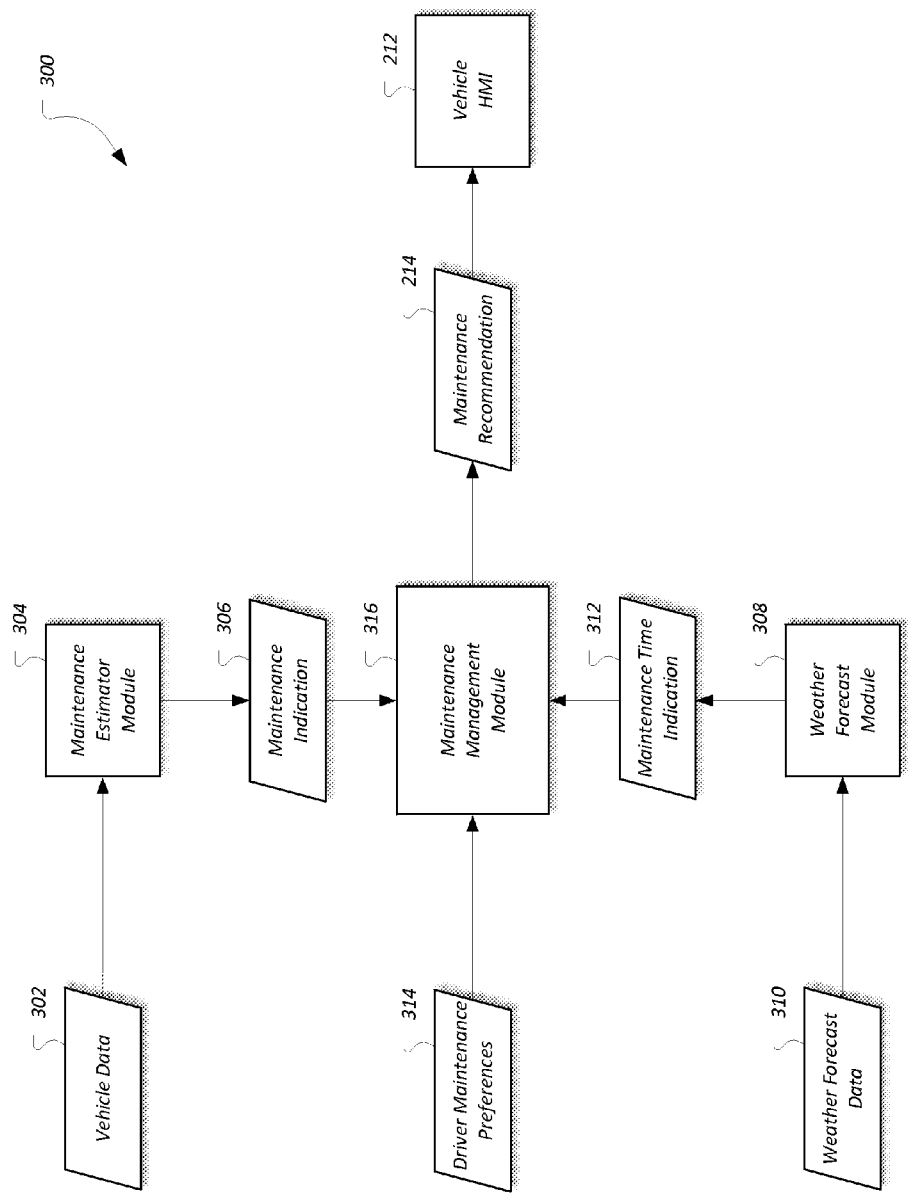
FIG. 3 illustrates an exemplary block diagram of a system using the maintenance recommendation application to provide maintenance recommendations to the driver.

FIG. 3 illustrates an exemplary block diagram 300 of a system using the maintenance recommendation application 210 to provide maintenance recommendations 214 to the driver. In an example, the modules of the maintenance recommendation application 210 may be implemented by one or more processors or microprocessors of the vehicle 31 (such as the CPU 3 of the VCS 1) configured to execute the instructions of the maintenance recommendation application 210 stored on one or more memory devices of the vehicle 31 (such as the storage 5 and 7). In other examples, the modules may be implemented by other combinations of hardware or hardware executing software and/or firmware configured to perform the operations discussed herein. As illustrated, the maintenance recommendation application 210 includes a maintenance estimator module 304 configured to receive vehicle data 302 and determine a maintenance indication 306. The maintenance recommendation application 210 further includes a weather forecast module 308 configured to receive weather forecast data 310 from the weather service 206 and determine a maintenance time indication 312. The maintenance recommendation application 210 also includes a maintenance delivery module 324 configured to receive the maintenance indication 306, the maintenance time indication 312, as well as driver maintenance preferences 314, and determine a maintenance recommendation 214 to be displayed via the vehicle HMI 212. It should be noted that the modularization of the maintenance recommendation application 210 illustrated in the diagram 300 is exemplary, and other arrangements or combinations of elements including more, fewer, or differently separated modules may be used.

The vehicle data 302 may include information retrieved from the vehicle sensors 204. As some examples, the vehicle data 302 may include information indicative of vehicle speed, yaw, pitch, roll, lateral acceleration, ambient temperature, accelerator pedal position, steering wheel angle, vehicle position, vehicle fluid temperatures, vehicle speed, and vehicle miles traveled. The maintenance recommendation application 210 may be configured to receive the vehicle data 302 from over a vehicle network. In an example, the vehicle network may be a controller-area network (CAN) network over which the vehicle sensors 204 may be configured to communicate.

The maintenance estimator module 304 may be configured to utilize the vehicle data 302 to identify whether any vehicle maintenance is required. For example, the maintenance estimator module 304 may be configured to identify whether the elements of the vehicle data 302 are indicative of maintenance that may be required according to the maintenance schedule 202 of the vehicle 31. As a more specific example, the maintenance estimator module 304 may identify, based on the maintenance schedule 202 of the vehicle 31 and the vehicle miles traveled vehicle data 302 retrieved from a vehicle odometer vehicle sensor 204, that an element of maintenance from the maintenance schedule 202 is due. As another example, the maintenance estimator module 304 may identify, based on the maintenance schedule 202 of the vehicle 31 and an amount of time since the last fluid change that a fluid change is due. As yet a further example, the maintenance estimator module 304 may identify, based on the maintenance schedule 202 of the vehicle 31 and temperature and average vehicle speed data that a fluid change is due.

When the maintenance estimator module 304 identifies that maintenance that may be required according to the maintenance schedule 202, the maintenance estimator module 304 may be configured to generate a maintenance indication 306. The maintenance indication 306 may indicate the item of maintenance that should be performed (e.g., oil change, new air filter, etc.). The maintenance indication 306 may also indicate a severity level for the item of maintenance that should be performed (e.g., a low priority where the maintenance does not require immediate action, a medium priority where the maintenance should be performed within a certain number of miles or days to preserve vehicle 31 operation or to avoid vehicle 31 damage, or a high priority where the vehicle 31 must not be driven until the maintenance is performed).

The weather forecast module 308 may be configured to query the weather service 206 for past, current or forecast weather conditions related to the timing for which the maintenance indication 306 indicates that maintenance should be performed. This retrieved information may be referred to as weather forecast data 310, and may include temperature, precipitation, allergen and other information retrieved from the weather service 206. Based on the weather forecast data 310, the weather forecast module 308 may be configured to generate a maintenance time indication 312 indicative of one or more times deemed by the weather forecast module 308 as being suitable. For instance, the maintenance time indication 312 may indicate a time or times where the weather is not expected to include precipitation.

The driver maintenance preferences 314 may include information indicative of how a driver, owner or other person responsive for maintenance to the vehicle 31 prefers to have the maintenance performed. For example, the driver maintenance preferences 314 may include indications of locations previously used to service the vehicle 31, times of day and days of the week during which the vehicle 31 was previously put into service, and preferred maintenance procedures unrelated to vehicle wear items (e.g., car washes, vehicle detailing). As another example, the driver maintenance preferences 314 may include information requesting that the user not receive reminders to perform the preferred maintenance procedures unrelated to vehicle wear items before or after certain weather. For instance, the driver maintenance preferences 314 may indicate that the user does not wish to be reminded to wash the vehicle 31 for a specified amount of days before a forecast storm or after a recorded storm.

The maintenance management module 316 may be configured to receive maintenance indications 306 from the maintenance estimator module 304, request maintenance time indications 312 from the weather forecast module 308, and determine, based on the driver maintenance preferences 314 and maintenance time indications 312, a maintenance recommendation 214 to be provided to the driver via the vehicle HMI 212. For example, the maintenance management module 316 may be configured to determine, based on the maintenance time indications 312, a time suitable for a maintenance procedure unrelated to the maintenance schedule 202 that is preferred by the driver based on the driver maintenance preferences 314. Responsive to the determination, the maintenance management module 316 may be further configured to generate a maintenance recommendation 214 suggesting that both the maintenance procedure unrelated to the maintenance schedule 202 and the maintenance indicated by the maintenance indications 306 be performed at the time suitable for maintenance procedure unrelated to maintenance schedule 202. As a specific example, the maintenance recommendation application 210 may determine that as it may rain today but not for the next three days, and that the driver prefers car washes, a maintenance recommendation 214 should be generated suggesting that the driver schedule to have vehicle maintenance performed tomorrow as well as a car wash at the same time.

Figure 4:
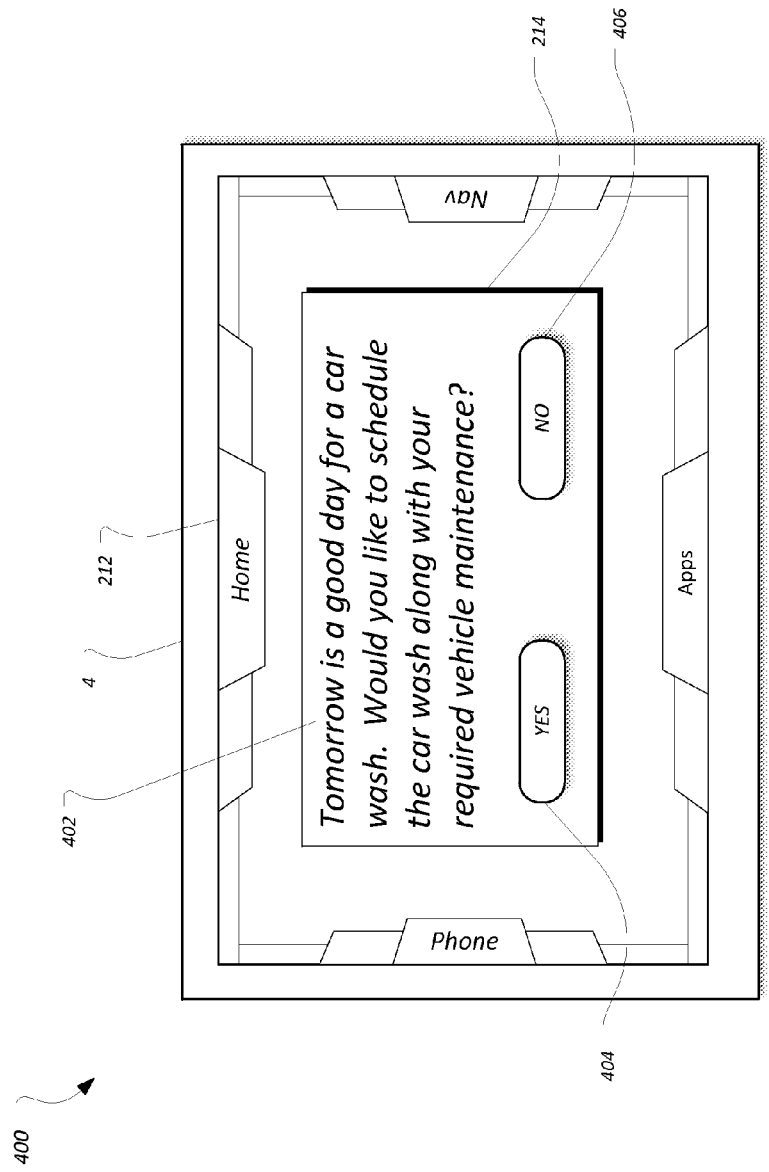
FIG. 4 illustrates an exemplary user interface illustrating a maintenance recommendation displayed by the maintenance recommendation application in the vehicle human-machine interface.

FIG. 4 illustrates an exemplary user interface 400 illustrating a maintenance recommendation 214 displayed by the maintenance recommendation application 210 in the vehicle HMI 212. In an example, the maintenance recommendation 214 may be displayed (e.g., upon vehicle 31 startup, responsive to generation, etc.) when the maintenance recommendation application 210 determines that a maintenance recommendation 214 has been generated by the maintenance recommendation application 210 for which the recommended maintenance has not yet been performed. As displayed, the maintenance recommendation 214 includes a message 402 indicating a proposed day for performing vehicle 31 maintenance required by the maintenance schedule 202 as well as a maintenance procedure unrelated to the maintenance schedule 202 (e.g., a car wash). The user interface 400 further includes additional controls configured to receive user input regarding acceptance or rejection of the provided maintenance recommendation 214. For instance, the user interface may include a yes control 404 configured to receive input from the user (e.g., touch input, voice input, etc.) indicative of acceptable of the maintenance recommendation 214, and a no control 406 configured to receive input from the user indicative of rejection of the maintenance recommendation 214.

If the user accepts the maintenance recommendation 214, the maintenance recommendation application 210 may be configured to utilize the maintenance scheduler service 208 to finalize an appointment for the user to have the maintenance performed to the vehicle 31. If the user rejects the maintenance recommendation 214, in some cases the maintenance recommendation 214 may be offered again at a later time (e.g., upon next key-on, the next day, etc.). In other cases, if the maintenance recommendation 214 is for a high priority maintenance item where the vehicle 31 must not be driven until the maintenance is performed, the maintenance recommendation application 210 may prevent dismissal of the maintenance recommendation 214 until the maintenance condition is addressed.

FIG. 5 illustrates an exemplary process 500 for providing maintenance recommendations 214. The process 500 may be performed, for example, by the maintenance recommendation application 210 executed by the VCS 1 or the nomadic device 53.

At operation 502, the maintenance recommendation application 210 determines a maintenance indication 306. For example, the maintenance estimator module 304 of the maintenance recommendation application 210 may identify whether elements of the vehicle data 302 retrieved from the vehicle sensors 204 are indicative of maintenance that may be required according to the maintenance schedule 202 of the vehicle 31. When the maintenance estimator module 304 identifies that maintenance that may be required according to the maintenance schedule 202, the maintenance estimator module 304 may generate a maintenance indication 306. The maintenance indication 306 may indicate the item of maintenance that should be performed as well as a severity level for the item of maintenance that should be performed.

At operation 504, the maintenance recommendation application 210 determines a maintenance time indication 312. For example, the maintenance recommendation application 210 may identify weather conditions suitable for a maintenance procedure unrelated to the maintenance schedule 202 but preferred by the driver according to the driver maintenance preferences 314. The maintenance recommendation application 210 may further utilize the weather forecast module 308 of the maintenance recommendation application 210 to query the weather service 206 for current or forecast weather conditions related to the timing for which the maintenance indication 306 indicates that maintenance should be performed. Based on the weather forecast data 310, the weather forecast module 308 may generate a maintenance time indication 312 indicative of one or more times deemed suitable for performing the a maintenance procedure unrelated to the maintenance schedule 202 (e.g., appropriate weather for a car wash).

At operation 506, the maintenance recommendation application 210 generates a maintenance recommendation 214. For example, the maintenance management module 316 of the maintenance recommendation application 210 may receive maintenance indications 306 from the maintenance estimator module 304, receive maintenance time indications 312 from the weather forecast module 308, and determine, based on the driver maintenance preferences 314, a maintenance recommendation 214 to be provided to the driver via the vehicle HMI 212. The maintenance management module 316 may accordingly determine, based on the maintenance time indications 312, a time suitable for maintenance procedure unrelated to the vehicle maintenance schedule 202, and may generate a maintenance recommendation 214 suggesting that both the maintenance procedure unrelated to the maintenance schedule 202 and the maintenance indicated by the maintenance indications 306 be performed at the time suitable for the maintenance procedure unrelated to the vehicle maintenance schedule 202. For instance, the driver maintenance preferences 314 may indicate that the user does not wish to be reminded to wash the vehicle 31 for a specified amount of days before a forecast storm or after a recorded storm, so the maintenance recommendation application 210 may accordingly generate the maintenance recommendation 214 in compliance with the driver maintenance preferences 314 responsive to the information received from the weather forecast module 308.

At operation 508, the maintenance recommendation application 210 displays the maintenance recommendation 214 via the vehicle HMI 212. In an example, FIG. 4 illustrates an exemplary user interface 400 including display of a maintenance recommendation 214. From the user interface 400, the user may select to schedule the recommended maintenance. After operation 508, the process 500 ends.

FIG. 6 illustrates an exemplary process 600 for updating the VCS 1 with respect to maintenance being performed to the vehicle 31. As with the process 500, the process 600 may be performed, for example, by the maintenance recommendation application 210 executed by the VCS 1 or the nomadic device 53.

At operation 602, the maintenance recommendation application 210 receives an indication of completed vehicle 31 maintenance. In an example, the maintenance recommendation application 210 may identify based on received vehicle data 302 (e.g., fluid level/quality, tire pressure, etc.) that the recommended vehicle 31 maintenance has been completed. In another example, the maintenance recommendation application 210 may identify that the vehicle 31 has spent at least a predetermined amount of time at a location (car wash, dealership, etc.) at which vehicle 31 maintenance was likely performed, and responsive to the identification may provide a user interface prompt to receive confirmation that the recommended maintenance has been performed. In yet a further example, the VCS 1 may be configured to receive manual input from the user (e.g., resetting of a maintenance recommendation 214 displayed in the vehicle HMI 212, utilizing a maintenance reset function of the VCS 1, etc.) indicating that the recommended vehicle 31 maintenance was performed. As yet another example, the maintenance recommendation application 210 may determine that the recommended vehicle 31 maintenance has been completed based on maintenance scheduling information for the vehicle 31 retrieved from the maintenance scheduler service 208.

At operation 604, the maintenance recommendation application 210 updates the maintenance recommendation 214. For example, based on receiving the vehicle data 302 or input from the user, the maintenance recommendation application 210 may mark the maintenance recommendation 214 as complete or remove the maintenance recommendation 214 from VCS 1 memory. Accordingly the vehicle HMI 212 may dismiss the maintenance recommendation 214 or otherwise no longer show the maintenance recommendation 214 in the vehicle HMI 212.

At operation 606, the maintenance recommendation application 210 updates the driver maintenance preferences 314. For example, the maintenance recommendation application 210 may update the driver maintenance preferences 314 with respect to the location used to service the vehicle 31, times of day and days of the week during which the vehicle 31 was put into service, and whether maintenance procedures unrelated to vehicle wear items (e.g., car washes, vehicle detailing) were also performed. The driver maintenance preferences 314 may accordingly be used to better inform the maintenance recommendation application 210 in forming future maintenance recommendations 214 for the vehicle 31. After operation 606, the process 600 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
vehicle sensors; and
a processor configured to
receive vehicle data from the vehicle sensors,
determine, based on the vehicle data and a vehicle maintenance schedule, a maintenance indication indicative of vehicle maintenance that is due,
identify a maintenance time indication for performing a weather-specific maintenance procedure unrelated to the vehicle maintenance schedule based on timeframes before and after weather predicted by weather forecast data during which maintenance recommendations are not to be indicated, and
display a maintenance recommendation offering to perform the vehicle maintenance and the weather-specific maintenance procedure at a time indicated by the maintenance time indication.

2. The system of claim 1, wherein the processor is further configured to provide the maintenance recommendation in a vehicle human-machine interface.

3. The system of claim 2, wherein the processor is further configured to:
receive user input accepting the maintenance recommendation, and
schedule the vehicle maintenance and the weather-specific maintenance procedure with a maintenance scheduling service.

4. The system of claim 2, wherein the maintenance recommendation displays a message indicating a proposed day for performing the vehicle maintenance required by the maintenance schedule and the weather-specific maintenance procedure.

5. The system of claim 2, wherein the maintenance recommendation includes user interface controls configured to receive user input regarding acceptance or rejection of the maintenance recommendation.

6. The system of claim 1, wherein the processor is further configured to receive the vehicle data from vehicle sensors connected to a controller area network of the vehicle.

7. The system of claim 1, wherein the processor is further configured to identify the maintenance time indication according to properties of weather appropriate for the weather-specific maintenance procedure and where the weather forecast data is queried by the processor from a weather service.

8. The system of claim 1, wherein the processor is further configured to identify the weather-specific maintenance procedure based on driver maintenance preferences maintained by the vehicle.

9. The system of claim 1, wherein the weather-specific maintenance procedure includes a vehicle wash.

10. The system of claim 1, wherein the maintenance schedule includes at least one of maintenance procedures specified according to a predetermined interval of time, or maintenance procedures specified according to an interval number of miles.

11. A system comprising:
vehicle sensors; and
a processor configured to
- identify, based on driver maintenance preferences, a weather-specific maintenance procedure unrelated to a vehicle maintenance schedule,
- identify a maintenance time indication according to properties of weather appropriate for the weather-specific maintenance procedure and weather forecast data queried from a weather service using driver maintenance preferences indicating timeframes before and after predicted weather during which maintenance recommendations are not to be indicated, and
- display a maintenance recommendation offering to perform required vehicle maintenance determined based on data from the vehicle sensors and the weather-specific maintenance procedure at a time indicated by the maintenance time indication.

12. The system of claim 11, wherein the processor is further configured to determine, based on vehicle data received from the vehicle sensors and the vehicle maintenance schedule, a maintenance indication indicative of the required vehicle maintenance being due.

13. The system of claim 12, wherein the processor is further configured to receive the vehicle data from vehicle sensors connected to a controller area network of the vehicle.

14. The system of claim 11, wherein the processor is further configured to provide the maintenance recommendation in a vehicle human-machine interface.

15. The system of claim 14, wherein the processor is further configured to:
- receive user input accepting the maintenance recommendation, and
- schedule the required vehicle maintenance and the weather-specific maintenance procedure with a maintenance scheduling service.

16. The system of claim 14, wherein the maintenance recommendation displays a message indicating a proposed day for performing the vehicle maintenance required by the maintenance schedule and the weather-specific maintenance procedure.

17. The system of claim 14, wherein the maintenance recommendation includes user interface controls configured to receive user input regarding acceptance or rejection of the maintenance recommendation.

18. The system of claim 11, wherein the weather-specific maintenance procedure includes a vehicle wash.

19. The system of claim 11, wherein the maintenance schedule includes at least one of maintenance procedures specified according to a predetermined interval of time, or maintenance procedures specified according to an interval number of miles.

20. A method comprising:
- generating, by a processor of a vehicle, using a vehicle maintenance schedule and vehicle data received by the processor from vehicle sensors over a controller area network of the vehicle, a maintenance indication indicating a maintenance procedure to be performed to the vehicle;
- generating, by the processor, a maintenance time indication indicative of one or more times deemed suitable for performing a maintenance procedure unrelated to the maintenance schedule by querying a weather service for weather conditions while accounting for driver maintenance preferences indicating timeframes before and after the weather during which maintenance recommendations are not to be indicated;
- displaying, to a user interface screen of the vehicle, a maintenance recommendation suggesting a day suitable for the maintenance procedure unrelated to the vehicle maintenance schedule, and suggesting that both the maintenance procedure unrelated to the maintenance schedule and the maintenance indicated by the maintenance indication be performed that day; and
- responsive to user input to the screen accepting the maintenance recommendation, schedule an appointment for the vehicle to have both the maintenance procedure unrelated to the maintenance schedule and the maintenance indicated by the maintenance indication performed.

* * * * *